United States Patent
Knee

(10) Patent No.: US 8,351,705 B2
(45) Date of Patent: Jan. 8, 2013

(54) DEFINING IMAGE FEATURES AND USING FEATURES TO MONITOR IMAGE TRANSFORMATIONS

(75) Inventor: Michael James Knee, Petersfield (GB)

(73) Assignee: Snell Limited, Berkshire (GB)

( * ) Notice: Subject to any disclaimer, the term of this patent is extended or adjusted under 35 U.S.C. 154(b) by 281 days.

(21) Appl. No.: 12/899,200

(22) Filed: Oct. 6, 2010

(65) Prior Publication Data

US 2011/0085733 A1      Apr. 14, 2011

(30) Foreign Application Priority Data

Oct. 9, 2009 (GB) .................................. 0917706.4

(51) Int. Cl.
*G06K 9/46*       (2006.01)
(52) U.S. Cl. .......................... 382/190; 382/155; 382/238
(58) Field of Classification Search .................. None
See application file for complete search history.

(56) References Cited

U.S. PATENT DOCUMENTS

| 2002/0031261 | A1  | 3/2002 | Abe |
| 2007/0183667 | A1* | 8/2007 | Wyatt et al. ................... 382/201 |
| 2008/0199072 | A1* | 8/2008 | Kondo et al. ................. 382/155 |

OTHER PUBLICATIONS

Search Report for Great Britain Application No. 0917706.4, dated Feb. 2, 2010, 1 page.

* cited by examiner

*Primary Examiner* — Aaron W Carter
*Assistant Examiner* — Delomia Gilliard
(74) *Attorney, Agent, or Firm* — Michael Best & Friedrich LLP

(57) ABSTRACT

For monitoring an image transformation such as aspect ratio conversion, an image feature is defined by identifying a position in the image having a local spatial maximum value and then identifying four other positions in the image having local spatial minimum values such that the four minimum value positions surround the position of the maximum, a first pair of the minimums lie on a first line passing through maximum and a second pair of the minimums lie on a second line passing through the maximum.

17 Claims, 4 Drawing Sheets

DEFINING IMAGE FEATURES AND USING FEATURES TO MONITOR IMAGE TRANSFORMATIONS

CROSS-REFERENCE TO RELATED APPLICATION

This application claims priority to Great Britain Patent Application No. 0917706.4 filed Oct. 9, 2009, the entire contents of which is herein incorporated by reference.

FIELD OF INVENTION

This invention concerns the specification of features in an image so as to enable the identification and matching of corresponding features in a related image

BACKGROUND OF THE INVENTION

There are many image processing applications in which related images need to be compared. One is motion measurement in which the position change of a feature between different temporal samples, such as film frames, is measured. Monitoring and quality assurance systems for audiovisual programming need to compare images at different points along a distribution chain. Published UK patent application GB 2 457 694 describes how audiovisual material can be compared so as to confirm the integrity of such a chain. The comparison of television images can be impeded by processes which 're-frame' the picture; a common example is aspect-ratio (width to height ratio) conversion between 4:3 for standard-definition television and 16:9 for high-definition television. Such conversion may involve re-scaling and/or translation (positional shift) of the picture. A common example is the 'pan-scan' process where a narrower sub-region is taken from a 'wide-screen' image and this sub-region is 'panned' across the wide-screen image to follow significant action. Where material is 're-purposed' for display on portable, small-screen devices a small part of the original image may be selected. These processes may vary over time so as to maintain important action within a frame that is smaller than the original frame. In general these processes combine an affine transform of the image with 'cropping' in which part of the original picture is discarded.

It is helpful to be able to compare original and transformed images and measure the applied translation and re-scaling. Aspect ratio conversion and reframing can be detected and quantified by locating corresponding image features and comparing their size and position. And, comparison of image features between different images can be used to confirm identity of image content.

Known techniques for image matching include identifying a limited number of 'interest points' in the images and comparing these points; U.S. Pat. No. 6,711,293 is an example. However, known feature point definition methods are too complicated for use in real-time broadcast monitoring applications. The present invention provides a novel, robust and simple feature specification technique that is particularly applicable to the determination of differences in position and scale between corresponding portrayed features.

SUMMARY OF THE INVENTION

The invention consists in certain aspects in a method and apparatus for defining an image feature comprising the steps of a. Identifying a position in the image having a local spatial maximum value of an image parameter of the said image b. Identifying four other positions in the image having local spatial minimum values of the said image parameter such that
   1. the said four minimum value positions surround the position of the said local spatial maximum value, and
   2. a first pair of the said minimum value positions lie on a first line passing through the position of the said local spatial maximum and a second pair of the said minimum value positions lie on a second line passing through the position of the said local spatial maximum.

c. Storing or outputting data defining the positions of the four said minimum value positions with respect to the said maximum value position.

Advantageously, the said image is spatially sampled and both of the said lines are aligned with the spatial sampling structure of the said image.

Suitably, pixel-value data describing the said maximum and the four said minima is output.

In a preferred embodiment luminance values are described.

In another aspect, the present invention consists in a method for defining an image feature comprising the steps of identifying a first position in the image having a local spatial extremum value of an image parameter of the said image; identifying at least two other positions in the image having local spatial extremum values of the said image parameter such that no straight line passes through the first position and both said other positions; and storing or outputting data defining said first position and said other positions at least relative to said first position.

Advantageously, the local spatial extremum value at said first position is of opposite sense (maximum or minimum) to that of the local spatial extremum value at said at least two other positions.

Preferable said data includes relative values of the said image parameter at the respective positions.

The invention further consists in a method of monitoring a transformation between a first image and a second image, comprising the steps of identifying at least two image features in the first image by any aforesaid method, identifying the position of said image features in the second image and computing transform coefficients from the relative positions of the image features in the respective images.

BRIEF DESCRIPTION OF THE DRAWINGS

An example of the invention will now be described with reference to the drawings in which.

DETAILED DESCRIPTION OF THE INVENTION

One of the most basic image features that can be identified is a local, spatial maximum in an image parameter; an example is a pixel having a luminance value that exceeds the values of its immediate neighbours. In the invention such local maxima are identified and respective one dimensional variations in the values of nearby pixels are evaluated along a pair of lines passing through the maximum-value pixel to find four local-minimum-value pixels surrounding the maximum-value pixel.

Figure 1:
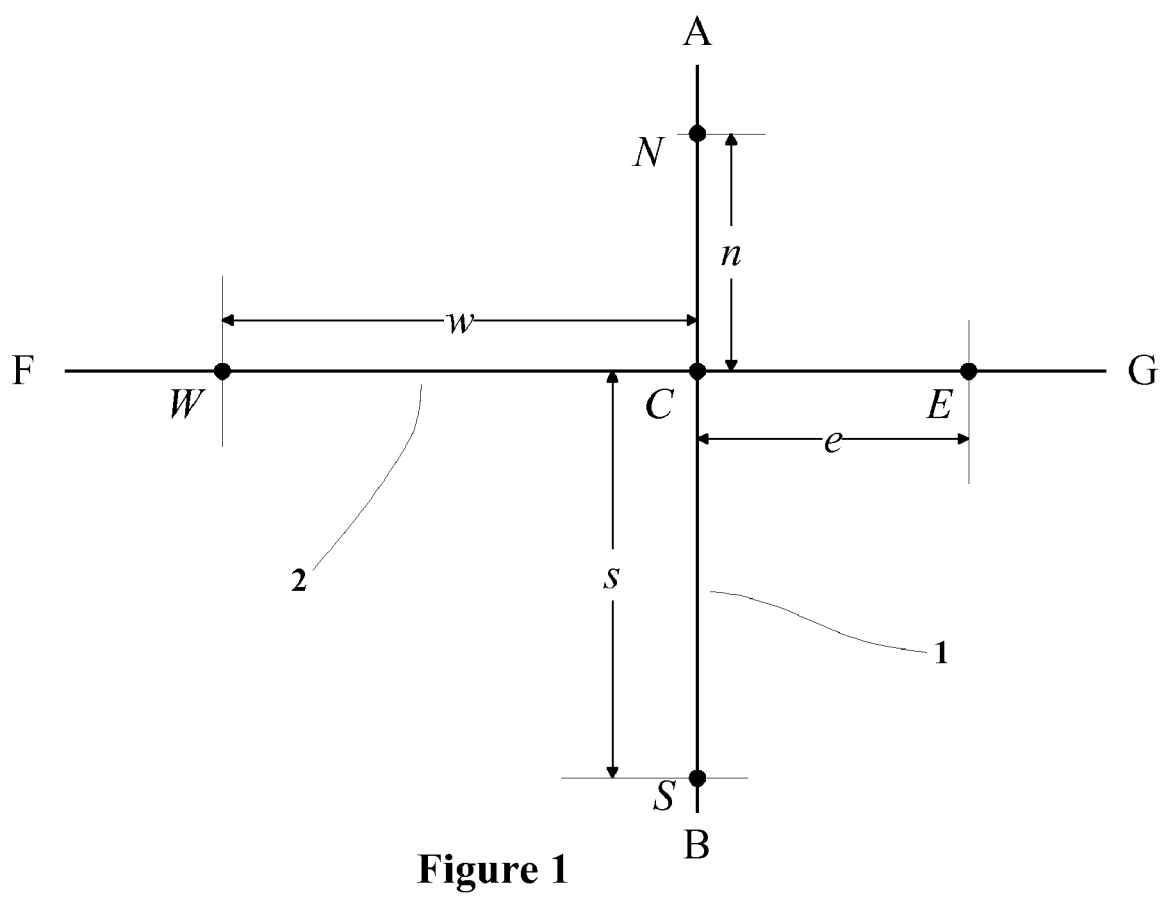
FIG. 1 shows a map of the relative positions of five points in an image.

This is illustrated in FIG. 1, which shows a map of pixel locations. Referring to the Figure, the pixel C has been identified as a local-maximum-value pixel. The line AB (1) is drawn through C in a convenient direction relative to the orientation of the image. The values of pixels lying on the line (1) are evaluated in the directions from C to A and from C to B respectively to find, for each direction, the local-minimum-value pixel located closest to C; these are pixels N and S.

The line FG (2) is drawn through C in a direction that it is not parallel to AB. The values of pixels lying on the line (2) are evaluated in the directions from C to F and from C to G respectively to find, for each direction, the local-minimum-value pixel located closest to C; these are pixels W and E.

Figure 2A:
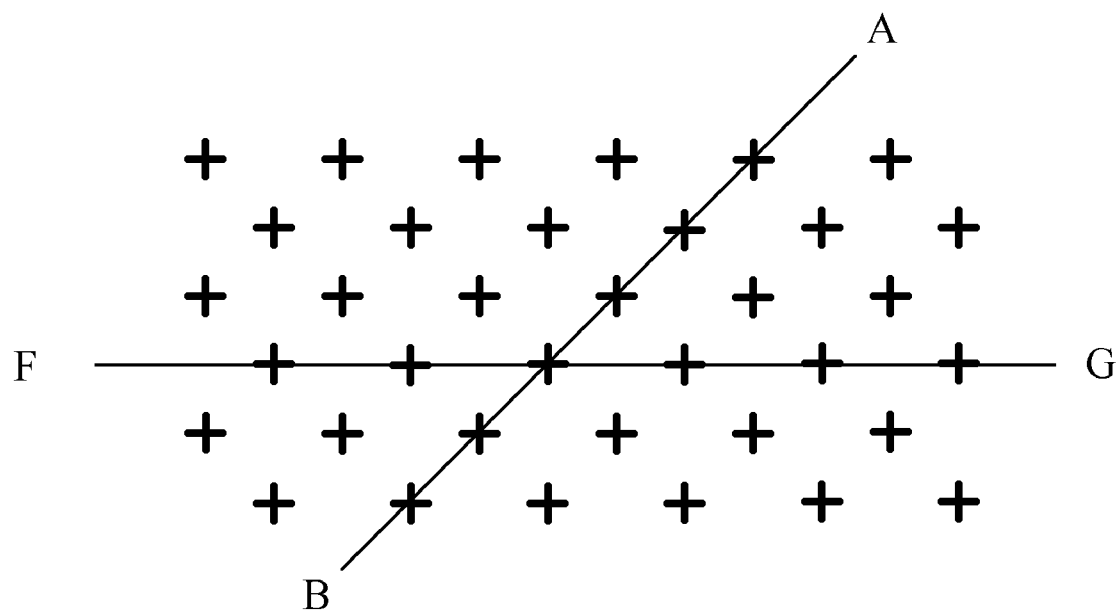
FIG. 2 shows two examples of pairs of lines aligned with two exemplary spatial sampling structures.
Figure 2B:
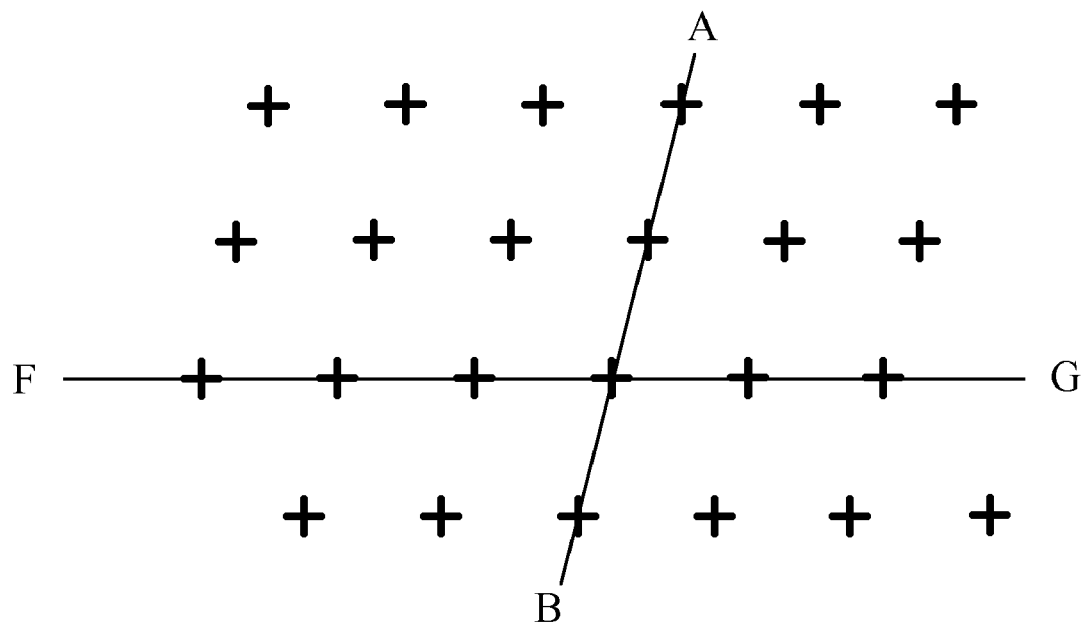

Typically, spatially sampled images are processed and the directions of the lines AB and FG are aligned with the spatial sampling structure or scanning raster of the image. Orthogonal sampling structures are widely used, and in this case the two lines can conveniently be perpendicular, as shown in FIG. 1. Where other sampling structures are used, other pairs of directions that are aligned with the sample structure can be used. FIG. 2a and FIG. 2b show different exemplary sample structures with possible directions for the lines AB and FG. Other directions may be chosen in order to simplify the implementation.

The four identifications of the pixels N, S, W, E are each one-dimensional processes; adjacent pixels on the relevant line AB or FG are compared to find a pixel having preceding and succeeding pixels with higher value. In each case, once the nearest pixel to C meeting this criterion is found, no other pixels need be examined.

The identification of the local-maximum-value pixel C, and the one-dimensional-minimum-value pixels N, S, W, E can be ambiguous if adjacent pixels have equal values. A way of overcoming this ambiguity is to increase the amplitude resolution of the pixel values, for example by representing them with 12 bits rather than 10, and then to add a steadily increasing offset value each pixel defined by a raster scan of the pixels. The offset added to succeeding pixels in the raster scan increases by one (new) least-significant bit for each next pixel. By this process an area of equal value pixels (at the original amplitude resolution) is converted to an area of steadily increasing pixel value, with the highest value pixel nearest to the bottom right hand corner of the original equal-value area. Any variation in pixel values due to the original image data is at a coarser amplitude resolution and cannot cause neighbouring pixels to have the same value (at the new, higher amplitude resolution).

The relative positions of the pixels N, W, C, E and S define the size and shape of an image feature located at C. This shape can be expressed by two parameters P and Q defined as follows:

a. $P = e \div (e+w)$
b. and
c. $Q = s \div (s+n)$
d. Where: e is the distance C to E;
   i. w is the distance C to W;
   ii. s is the distance C to S;
   iii. n is the distance C to N.

Thus the Cartesian co-ordinates of C together with the values of P and Q define the shape and position of an image feature. If the lines AB and FG are aligned with the pixel sampling structure or scanning raster, computation of the relevant co-ordinates and inter pixel distances is straightforward.

The set of five pixel values for the pixels N, W, C, E and S represent a pixel-value profile of the image feature. (The letter symbols identifying the pixels will also be used to represent their respective values in the following description.) In a preferred embodiment luminance values are used and the five values represent a luminance profile. It is sometimes helpful to define the luminance profile in a way that is invariant with changes in brightness. (Brightness adjustment, historically called 'lift' or 'sit' adjustment, is common in television processes.) A suitable set of brightness-invariant parameters is:

e. $\Delta N = C - N$
f. $\Delta W = C - W$
g. $\Delta E = C - E$
h. $\Delta S = C - S$ A further alternative is to make the luminance profile invariant with gain change (equivalent to contrast change). A suitable set of brightness- and gain-invariant parameters is:

i. $\Delta N' = (C-N) \div (C-M)$
j. $\Delta W' = (C-W) \div (C-M)$
k. $\Delta E' = (C-E) \div (C-M)$
l. Where: $M = (N+W+E+S) \div 4$ Note that, because the average value M is derived from the four values N W E S, the parameter m. $\Delta S' = (C-S) \div (C-M)$ can be used in place of any one of the parameters $\Delta N'$ $\Delta W'$ $\Delta E'$.

Thus an image feature can be precisely characterised by defining its position by the Cartesian co-ordinates of C, its shape by the parameters P and Q and its luminance profile by either $\Delta N$ $\Delta W$ $\Delta E$ $\Delta S$ or by $\Delta N'$ $\Delta W'$ $\Delta E'$.

A typical image will contain a very large number of image features that can be characterised in this way. In a practical image matching application it is usually helpful to identify only a small number of the most distinctive features in an image of interest. A process for doing this in accordance with an embodiment of the invention is illustrated in the flow-chart of FIG. 3. This process is typically applied to a spatially low-pass filtered image where the spatial bandwidth has been reduced by a factor in the range 8 to 32. Spatial sub-sampling, as opposed to filtering, is usually undesirable because it reduces the precision of the feature position information.

Figure 3:
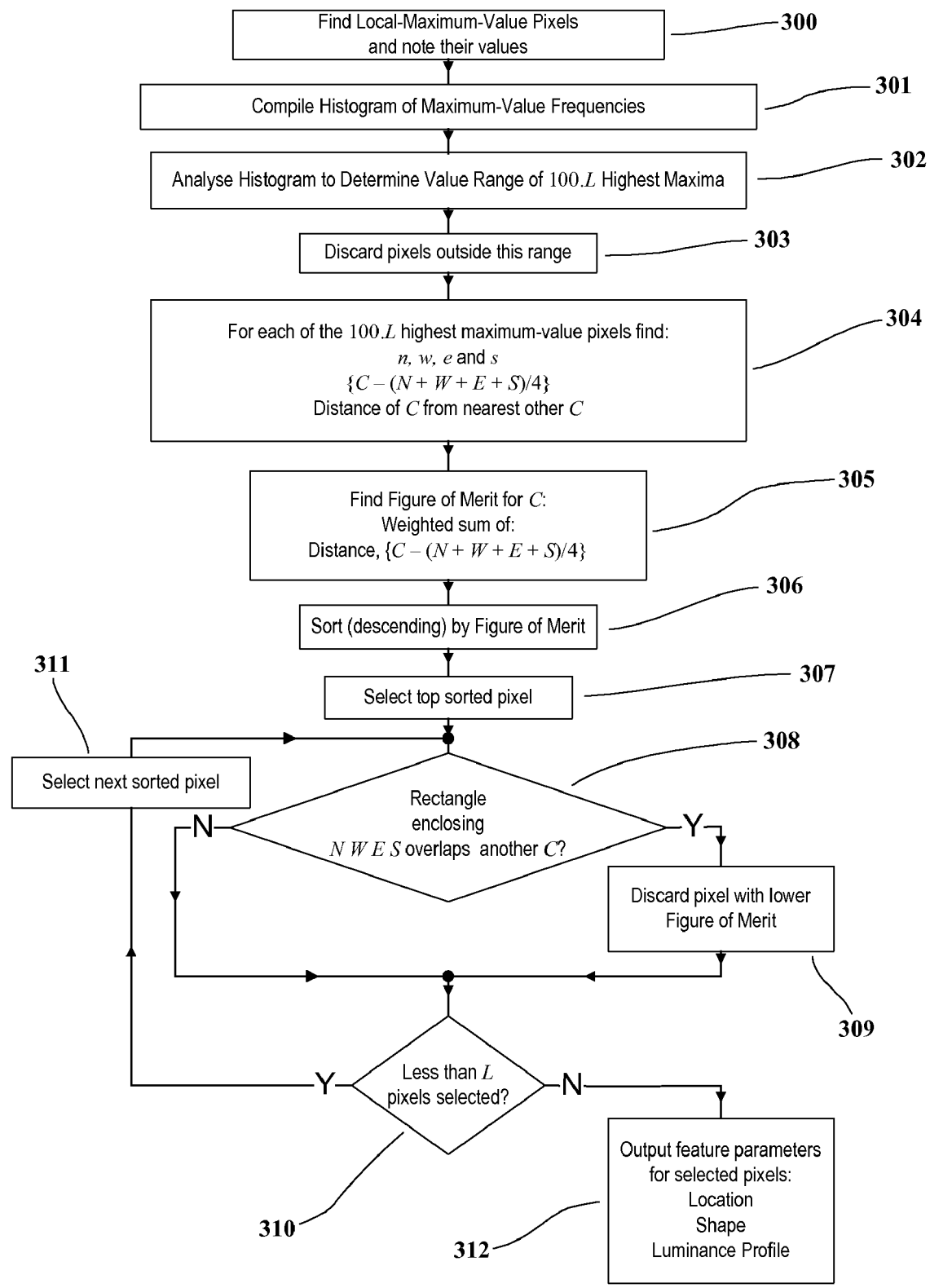
FIG. 3 shows a flow-chart of a process for deriving data describing one or more image features.

Referring to FIG. 3, a chosen image is analysed in step (300) to find local, spatial-maximum pixel values, and the corresponding positions and pixel values are stored. In typical broadcast monitoring applications no more than ten image features from a single frame need be fully characterised (see below). However, a larger number of candidate features is initially identified. In this example, if L features are to be characterised, 100·L are initially selected. These candidates are identified by choosing the highest-value spatial maxima. In step (301) the frequencies of occurrence of ranges of maximum values are counted in a histogram. In step (302) the histogram is analysed by a known method so as to estimate the range of values that corresponds to the set of 100·L highest-value pixels. As these are only candidates, the resolution of the histogram need not be high, and the required range need only be determined approximately. In step (303) the data corresponding to lower-valued maxima is discarded and the data on the 100·L highest maxima retained for further processing.

In step (304) each of the candidate maxima is analysed to find the shape and luminance profile of the corresponding image feature. And, a measure of the contrast of the feature and its distance from other candidate features is evaluated.

The contrast of the feature is obtained by taking the difference between the peak value at C and the average of the values of the surrounding minima:

n. Feature Contrast=$\{C-(N+W+E+S)/4\}$

The distance from other features is evaluated by comparing the Cartesian co-ordinates of C with those of all the other candidate maximum-value pixels and taking the smallest difference. Any convenient distance measure may be used, such as Euclidean distance or Manhattan distance for example.

In step (305) a figure of merit for each candidate feature is calculated by taking a weighted sum of the feature contrast and the distance measure. In step (306) the candidates are sorted according to their respective figures of merit. The required number of features is then selected by rejecting "overlapping" features, and features with low figures of merit, as follows.

In step (307) the candidate with the highest figure of merit is selected. In step (308) it is tested to see if the peak of any other candidate lies within the rectangle defined by the x co-ordinate of W, the x co-ordinate of E, the y co-ordinate of N and the y co-ordinate of S. If an overlap is found, the feature with the lower figure of merit is discarded in step (309). In step (310) a test is made to see if less than the required number of features have been selected, and either the candidate with the next-lowest figure of merit is selected in step (311), or, if the required number of features has been selected, the corresponding feature data is output, and the process ended, at step (312)

By following the process of FIG. 3 a set of L image features is obtained. Each of these can typically be characterised by ten bytes (eight-bit words) of data as follows:

Shape, 2 bytes: P Q
Luminance profile, 5 bytes: C N W E S
Position, 3 bytes: x y co-ordinates of C (Note that for high-definition television there may be around 1,000 lines, each comprising around 2,000 pixels.)

A typical application of the invention is the detection and characterisation of an aspect-ratio change or re-framing operation that has been applied at some point in a video distribution chain. Fields or frames at an "upstream" point in the chain are analysed and a modest number, say ten, image features are derived for each field or frame by the method described above. At a "downstream" point in the chain, corresponding fields or frames are analysed to obtain a smaller number of image features, say two, for each field or frame.

Typically it will be necessary to transmit the data defining the image features between two, separately-located monitoring sites via a low bandwidth auxiliary channel. Typically the monitoring process will take place at an "upstream" location and the "return" data path in the upstream direction will have low data capacity. Ten bytes per feature per frame gives a data rate of 4,000 bit/s for a 25 frame per second video signal that is characterised with two features per frame.

The upstream features and downstream features from corresponding frames are compared, and downstream features that match the shape and luminance profile of respective upstream features identified. The relative scale and relative position of matched features can be used to measure any shifting and/or re-scaling of the image.

Figure 4:
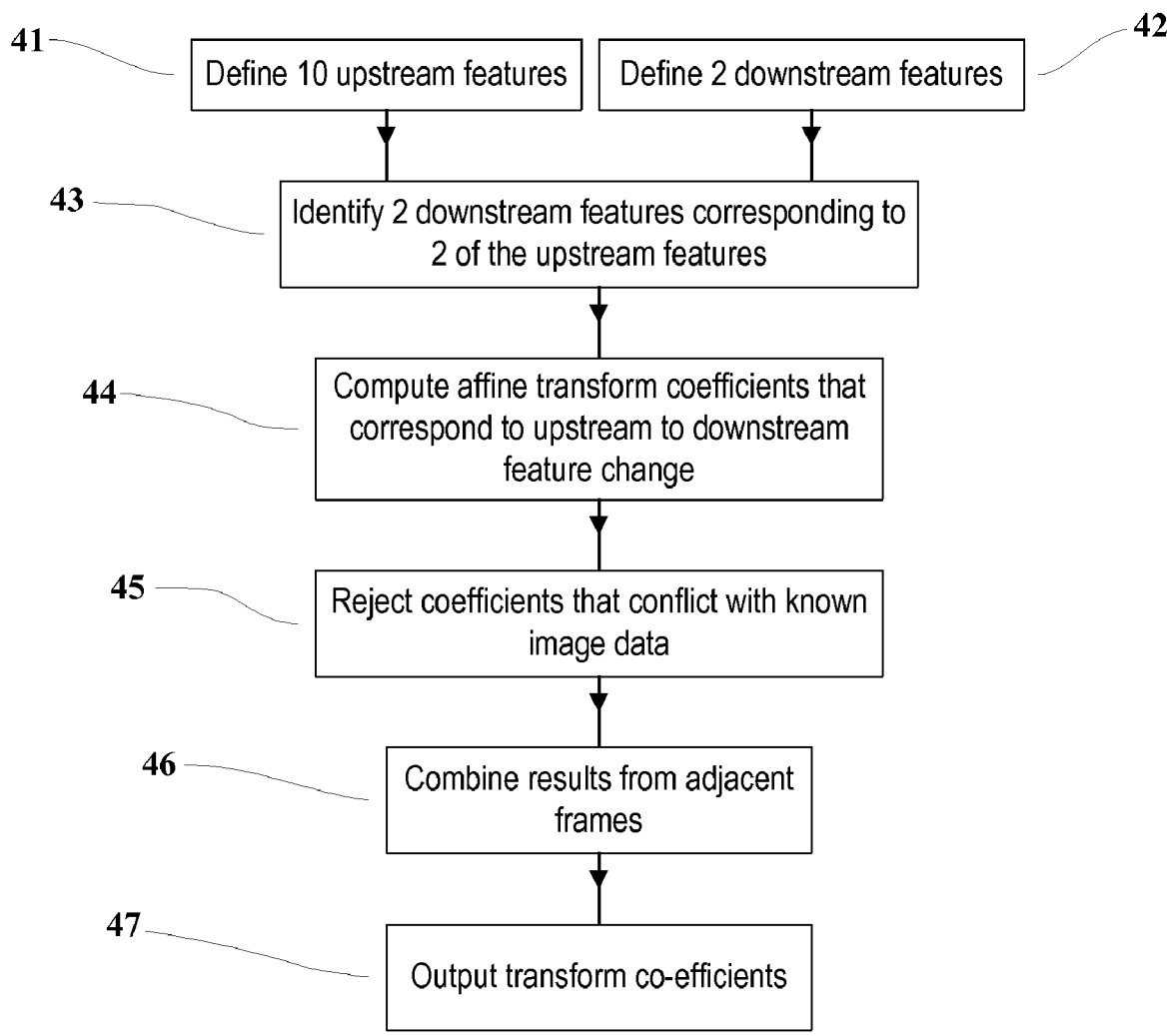
FIG. 4 shows a flow-chart of a process for comparing images to characterise an unknown aspect-ratio conversion process.

A process for quantifying an unknown aspect-ratio conversion or re-framing process that has been applied to an 'upstream' image sequence to generate a 'downstream image sequence is illustrated in the flowchart of FIG. 4. The inputs to the process are image feature descriptions, derived as described above, from equivalent frames in the upstream and downstream sequences. In order to obtain this data it is necessary to determine the temporal offset between the sequences. This is easy if suitable metadata, such as timecode is associated with the frames. If such data is unavailable it will be necessary to use suitable detected temporal events, such as shot changes to determine the correspondence between upstream and downstream frames.

Referring to FIG. 4, in step (41) ten features in an upstream frame are defined by the process of FIG. 3. In step (42) two features are similarly defined in the downstream frame that corresponds to the frame analysed in step (41). (This downstream frame would have been obtained by applying an aspect-ratio conversion or re-framing process to the corresponding upstream frame.)

In step (43) the data defining the two downstream features is compared with the data defining each of the ten upstream features in order to find the two upstream features that correspond with the downstream features. Matching features are identified by comparing the shape data, for example the shape parameters P Q, and the luminance profile data, for example the C N W E S values, of the respective upstream and downstream features. The result of step (43) is two pairs of respectively equivalent features that represent two different image features before and after the unknown image conversion process.

In step (44) the relative positions and shapes of the upstream and downstream features are compared in order to characterise the unknown conversion process. A typical aspect-ratio conversion or re-framing process can be described by an affine image transform having no rotational component. For example the positional relationship between an upstream pixel at co-ordinates x,y and a downstream pixel at co-ordinates x',y' can be described by the following equations:

o. $x'=a \cdot x+b$
p. $y'=c \cdot y+d$
q. Where a, b, c and d are parameters defining the transform.

The comparison of step (44) provides two corresponding pairs of feature co-ordinates. If these are:

r. Upstream co-ordinates $x_1, y_1$ corresponding to downstream co-ordinates $x_1', y_1'$; and,
s. Upstream co-ordinates $x_2, y_2$ corresponding to $x_2', y_2'$ Then the transform parameters are given by solution of simultaneous equations as:

t. $a=(x_1'-x_2') \div (x_1-x_2)$
u. $b=(x_1 \cdot x_2' - x_2 \cdot x_1') \div (x_1-x_2)$
v. $c=(y_1'-y_2') \div (y_1-y_2)$
w. $d=(y_1 \cdot y_2' - y_2 \cdot y_1') \div (y_1-y_2)$ These values are the result from step (44). In step (45) they are tested against the known data defining the conversion process. For example, as the downstream frame was derived from the upstream frame, the calculated transform parameters must not result in a transformation that would require any part of the downstream image to be constructed from a position that is outside the upstream image. If a small tolerance (5%) is allowed to account for errors in determining the feature positions the following limits to the transform parameters can be derived:

x. $b-0.05a \cdot X > 0$
y. $b+1.05a \cdot X < X'$
z. $d-0.05c \cdot Y > 0$
aa. $d+1.05c \cdot Y < Y'$
bb. Where: X and X' are the widths of the upstream and downstream images respectively; and,
  i. Y and Y' are the heights of the upstream and downstream images respectively.

And, if there are known limits to the scaling provided in the conversion process, the scaling parameters a and c can be tested for consistency with these limits thus:

cc. aX>rX' dd. cY>rY' ee. Where: r is the maximum expected magnification of the downstream picture with respect to the upstream picture.

If the transform parameters computed in step (44) are inconsistent with these known characteristics of the conversion process, then they are rejected in step (45).

In step (46) parameters derived from earlier frames in the sequence are combined recursively with the results for the current comparison. In step (47) the recursively filtered transform coefficients are output. Note that the recursion may need to be disabled at shot-changes or similar discontinuities in the image sequence.

The respective sizes of the upstream and downstream images XY and X'Y' respectively, together with the transform coefficients a b c d, fully define an aspect-ratio conversion or re-framing process. In some aspect-ratio conversion processes 'black bars' or 'side curtains' are added to one or more image edges. The values of X Y and X' Y' must not include these bars or curtains as they contain no useful image information. In a monitoring process that compares upstream and downstream images the image sizes are known because both images are available to the process, and the transform parameters can be determined as described above. Thus any such processing can be fully characterised by a monitoring system using the above described processes.

The process of FIG. 4 will output a sequence of transform parameters that will track a changing re-framing process, for example the movement of a downstream 'pan-scan' window across an upstream, wide-screen video sequence.

The above description has assumed that the sampling structures of the two images that are to be compared is the same. This need not be the case. For example the upstream image may have been sampled by a structure locked to a composite colour subcarrier, and the downstream image may be orthogonally sampled. In this case the upstream structure will typically be 'skewed' with respect to the downstream structure. Very small amounts of skew can be ignored, but the relationship between different structures can be represented by an affine transform. A transform with a skew component will have more parameters than the simplified transform previously described. If the two structures are significantly different, an inverse transform can by applied to samples in one structure to obtain values in the other structure.

There are other applications of the invention. The identification of corresponding features in different temporal samples of a scene can be used to compute motion vectors applicable to those features. The invention can also be applied to images which do not form part of a sequence of related images.

Although the use of luminance values has been described, other pixel values can be used, for example a combination of luminance and chrominance values could be used.

Different representations of the five pixels N W C E S can be used. Pixel amplitude parameters may be absolute or relative to each other, and may or may not be invariant with respect to gain/contrast change or with respect to offset/ brightness change.

Corresponding feature in different images may be identified by comparison of a limited number of image feature parameters, for example only shape information, or only luminance profile information may be used.

The positions of described image features need not be by means of Cartesian co-ordinates, other co-ordinate systems or methods of specifying position within an image may be used.

Images may or may not be filtered prior to the identification of features and, in some cases, for example where lower resolution of the positional information can be tolerated, images may be sub-sampled.

The invention claimed is:

1. A method of monitoring in a processor a transformation between a first image and a second image, comprising the steps of identifying at least one image feature in the first image and at least one image feature in the second image by, for each image, identifying a first position in the image having a local spatial extremum value of an image parameter of the said image; identifying at least two other positions in the image having local spatial extremum values of the said image parameter such that no straight line passes through the first position and both said other positions; and storing or outputting data defining said first position and said other positions at least relative to said first position.

2. A method according to claim 1, wherein the local spatial extremum value at said first position is of opposite sense (maximum or minimum) to that of the local spatial extremum value at said at least two other positions.

3. A method according to claim 1, wherein said data includes relative values of the said image parameter at the respective positions.

4. A method according to claim 1; comprising the steps of identifying at least two image feature in each image and computing transform coefficients from the relative positions of the image features in the respective images.

5. A method according to claim 1, wherein a. the step of identifying a first position in the image having a local spatial extremum value of an image parameter comprises the step of identifying a position in the image having a local spatial maximum value of an image parameter of the said image;

b. the step of identifying at least two other positions in the image having local spatial extremum values of the said image parameter such that no straight line passes through the first position and both said other positions comprises the step of identifying four other positions in the image having local spatial minimum values of the said image parameter such that 1. the said four minimum value positions surround the position of the said local spatial maximum value, and 2. a first pair of the said minimum value positions lie on a first line passing through the position of the said local spatial maximum and a second pair of the said minimum value positions lie on a second line passing through the position of the said local spatial maximum.

6. A method according to claim 5 in which the said image is spatially sampled and both of the said lines are aligned with the spatial sampling structure of the said image.

7. A method according to claim 5 in which pixel-value data describing the said maximum and the four said minima is output.

8. A method according to claim 7 in which luminance values are output.

9. A method according to claim 7 in which the said pixel-value data is derived from differences between pixel-values.

10. Image processing apparatus comprising a local maximum finder for identifying a first position in the image having a local spatial maximum value of an image parameter of the said image; and a minimum finder for identifying four other positions in the image having local spatial minimum values of the said image parameter such that the said four minimum value positions surround the position of the said local spatial maximum value, and a first pair of the said minimum value positions lie on a first line passing through the position of the said local spatial maximum and a second pair of the said minimum value positions lie on a second line passing through the position of the said local spatial maximum.

11. Image processing apparatus comprising an upstream feature detector for identifying at least N image features in a first image by identifying a first position in the first image having a local spatial extremum value of an image parameter of the said image; identifying at least two other positions in the first image having local spatial extremum values of the said image parameter such that no straight line passes through the first position and both said other positions; a downstream feature detector for identifying at least M image features in a second image by identifying a first position in the second image having a local spatial extremum value of an image parameter of the second image; identifying at least two other positions in the second image having local spatial extremum values of the said image parameter such that no straight line passes through the first position and both said other positions; a corresponding feature selector for selecting at least two detected image features in the second image which correspond respectively with detected image features in the first image and a transform coefficient unit for computing from the location of the selected and corresponding image features coefficients of a transform between the first image and the second image.

12. Apparatus according to claim 11, wherein the local spatial extremum value at said first position is of opposite sense (maximum or minimum) to that of the local spatial extremum value at said at least two other positions.

13. Apparatus according to claim 12, wherein a. the step of identifying a first position in the image having a local spatial extremum value of an image parameter comprises the step of identifying a position in the image having a local spatial maximum value of an image parameter of the said image;

b. the step of identifying at least two other positions in the image having local spatial extremum values of the said image parameter such that no straight line passes through the first position and both said other positions comprises the step of identifying four other positions in the image having local spatial minimum values of the said image parameter such that 1. the said four minimum value positions surround the position of the said local spatial maximum value, and 2. a first pair of the said minimum value positions lie on a first line passing through the position of the said local spatial maximum and a second pair of the said minimum value positions lie on a second line passing through the position of the said local spatial maximum.

14. Apparatus according to claim 13 in which the said image is spatially sampled and both of the said lines are aligned with the spatial sampling structure of the said image.

15. Apparatus according to claim 11 in which pixel-value data describing the said maximum and the four said minima is utilised.

16. Apparatus according to claim 11 in which luminance values are utilised.

17. Apparatus according to claim 11 in which pixel-value data is derived from differences between pixel-values.

* * * * *